United States Patent
Kakadia et al.

(10) Patent No.: US 9,191,282 B2
(45) Date of Patent: Nov. 17, 2015

(54) SERVICE LEVEL AGREEMENT (SLA) BASED PROVISIONING AND MANAGEMENT

(71) Applicants: Verizon Patent and Licensing Inc., Basking Ridge, NJ (US); Cellco Partnership, Basking Ridge, NJ (US)

(72) Inventors: Deepak Kakadia, Antioch, CA (US); Donna L. Polehn, Kirkland, WA (US); Lalit R. Kotecha, San Ramon, CA (US); John F. Macias, Antelope, CA (US); Maria G. Lam, Oakland, CA (US)

(73) Assignees: Verizon Patent and Licensing Inc., Basking Ridge, NJ (US); Cellco Partnership, Basking Ridge, NJ (US)

( * ) Notice: Subject to any disclaimer, the term of this patent is extended or adjusted under 35 U.S.C. 154(b) by 0 days.

(21) Appl. No.: 14/093,194

(22) Filed: Nov. 29, 2013

(65) Prior Publication Data

US 2015/0156082 A1 Jun. 4, 2015

(51) Int. Cl.
*G06F 15/16* (2006.01)
*H04L 12/24* (2006.01)
*H04L 12/863* (2013.01)

(52) U.S. Cl.
CPC ........ *H04L 41/5009* (2013.01); *H04L 41/5006* (2013.01); *H04L 41/5019* (2013.01); *H04L 47/50* (2013.01)

(58) Field of Classification Search
CPC ...................... H04L 41/0213; H04L 29/08072
USPC ........................................................ 709/223
See application file for complete search history.

(56) References Cited

U.S. PATENT DOCUMENTS

| | | | |
|---|---|---|---|
| 6,665,702 B1 * | 12/2003 | Zisapel et al. | 718/105 |
| 8,218,445 B2 * | 7/2012 | Katz et al. | 370/238 |
| 8,612,648 B1 * | 12/2013 | Murray | 710/52 |
| 8,788,640 B1 * | 7/2014 | Masters | 709/223 |
| 2004/0064582 A1 * | 4/2004 | Raghunath et al. | 709/240 |
| 2004/0158503 A1 * | 8/2004 | Gross | 705/26 |
| 2004/0196788 A1 * | 10/2004 | Lodha | 370/230 |
| 2008/0019266 A1 * | 1/2008 | Liu et al. | 370/228 |
| 2008/0155087 A1 * | 6/2008 | Blouin et al. | 709/223 |
| 2008/0225713 A1 * | 9/2008 | Tychon et al. | 370/231 |
| 2009/0041039 A1 * | 2/2009 | Bear et al. | 370/401 |
| 2009/0125631 A1 * | 5/2009 | Blom et al. | 709/228 |
| 2009/0216910 A1 * | 8/2009 | Duchesneau | 709/250 |
| 2009/0296572 A1 * | 12/2009 | Xiong | 370/228 |
| 2010/0110907 A1 * | 5/2010 | Kotrla et al. | 370/252 |
| 2011/0161526 A1 * | 6/2011 | Ravindran et al. | 709/250 |

* cited by examiner

*Primary Examiner* — David X Yi
*Assistant Examiner* — Atta Khan

(57) ABSTRACT

Service level agreement (SLA) based monitoring and configuration of a path for transmission of data is achieved by identifying an SLA associated with the data and determining transmission requirements associated with the SLA. A status of a network element in the path, such as data occupancy of a data queue included in the network element, may be determined and used to select one of a high bandwidth portion or a low bandwidth portion of the pathway. The occupancy of the queue may be used to estimate a transmission delay, and the estimated transmission delay is used to select between the high bandwidth portion and the low bandwidth portion. The data may be directed to the selected bandwidth portion by changing a quality of service (QoS) value or other attribute associated with the data.

19 Claims, 7 Drawing Sheets

FIG. 5

| SLA IDENTIFIER 510 | IDENTIFYING FEATURES 520 | ASSOCIATED KPIS 530 |
|---|---|---|
| SLA 1 | NETWORK ADDRESS | TRANSIT TIME ≤ 0.5 SECOND<br>DROPPED PACKETS ≤ 5% |
| SLA 2 | DATA FORMAT | TRANSIT TIME ≤ 0.1 SECOND<br>BW ≥ 10 MB/SECOND |
| SLA 3 | URL | BW ≥ 20 MB/SECOND |
| ... | ... | ... |

500

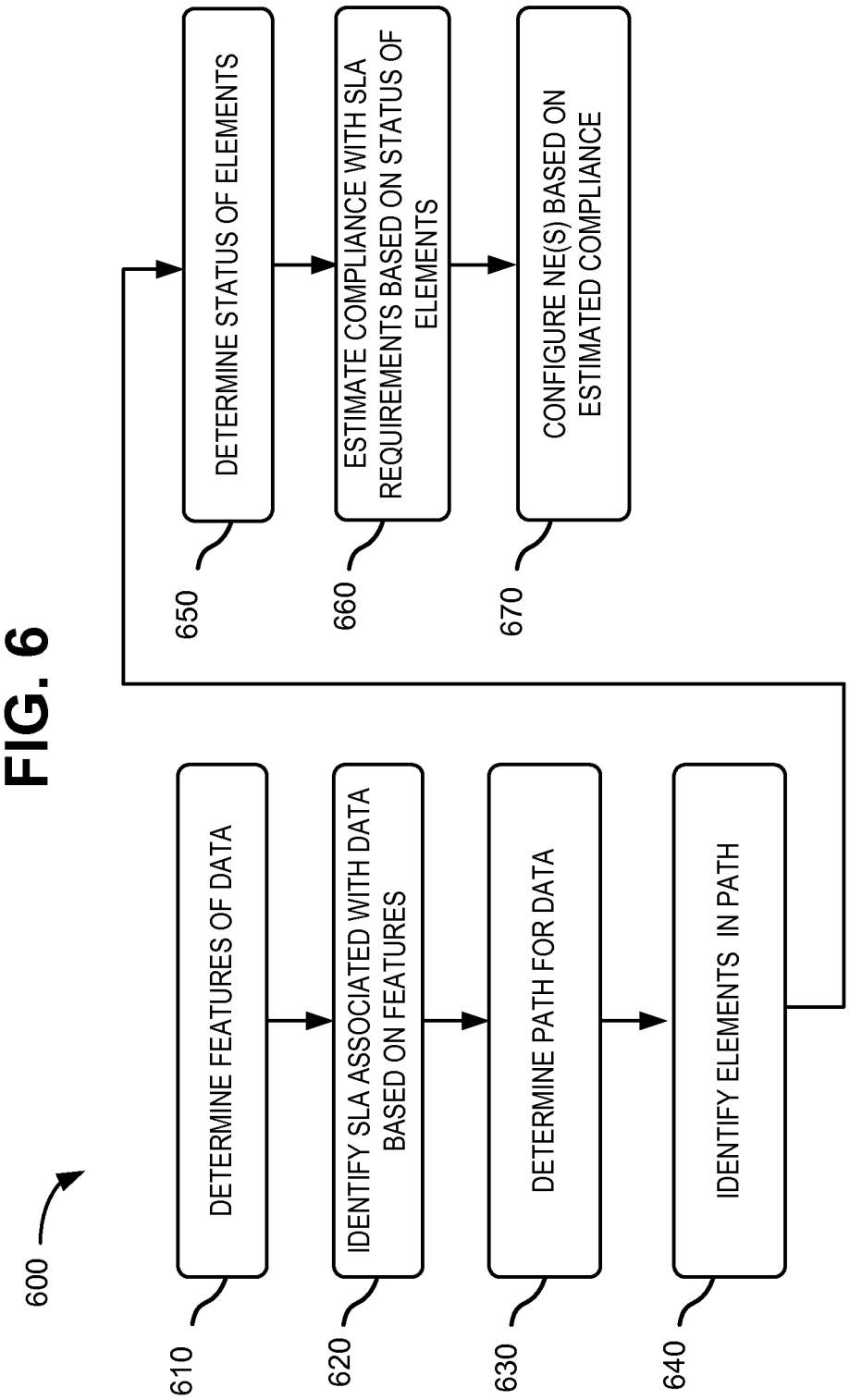

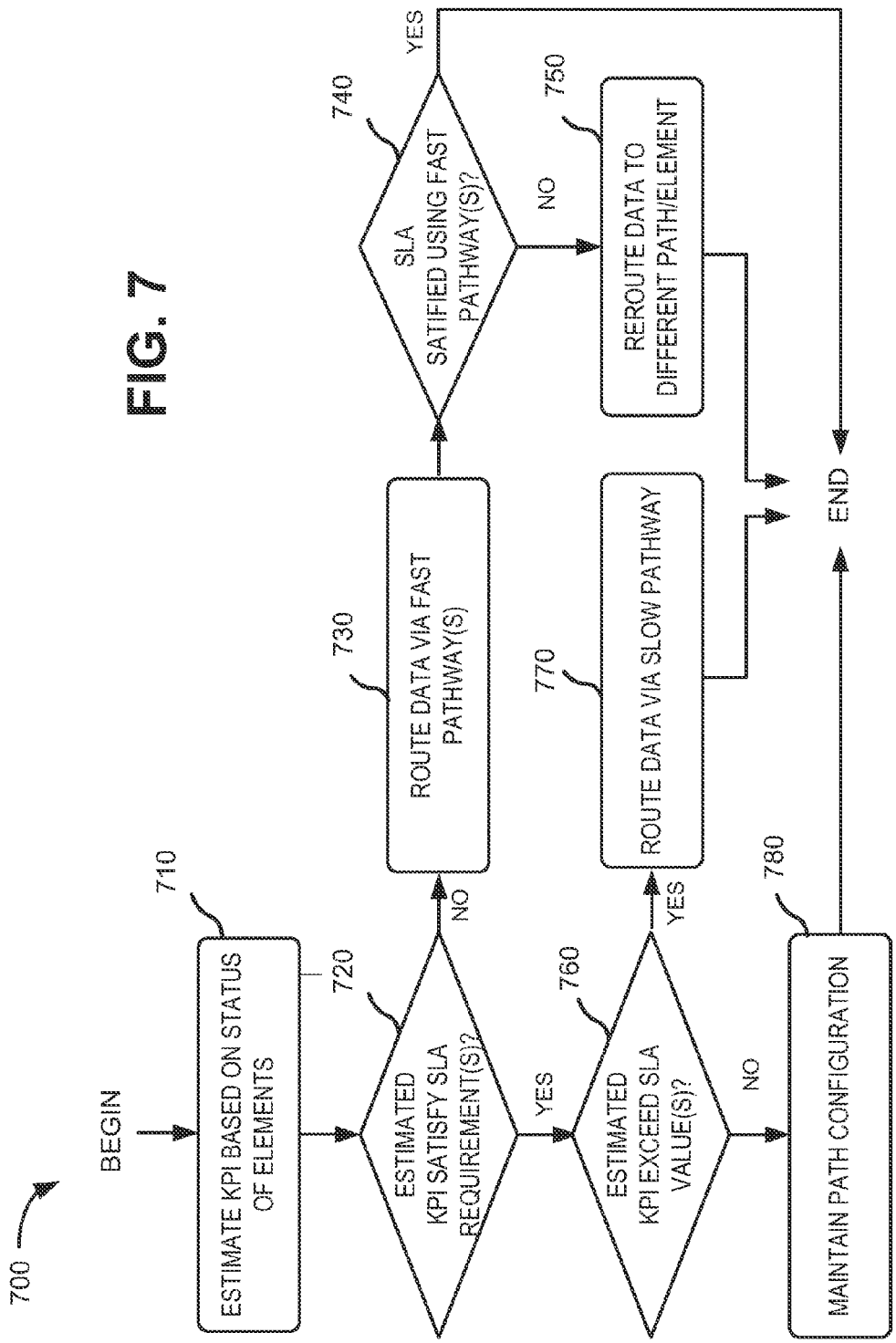

SERVICE LEVEL AGREEMENT (SLA) BASED PROVISIONING AND MANAGEMENT

BACKGROUND

A service-level agreement (SLA) is a part of a service contract where a service is formally defined. The SLA may specify the levels of availability, serviceability, performance, operation, or of other attributes of the service. Each level may also be specified as "expected" or "minimum," which allows customers to be informed what to expect (the minimum), while providing a measurable (average) target value that shows the level of organization performance. As an example, an Internet service provider may include SLAs within the terms of their contracts with customers to define the level(s) of service being sold. In the case of the Internet service provider, an SLA may include terms related to, for example, a mean time between failures (MTBF), mean time to repair or mean time to recovery (MTTR), various data rates; throughput, jitter, or similar measurable criteria.

BRIEF DESCRIPTION OF THE DRAWINGS

FIG. 5 illustrates an exemplary table that may be stored by a control device included in the environment of FIG. 1; and FIGS. 6 and 7 are flow charts depicting an exemplary process for SLA-based provisioning and management.

DETAILED DESCRIPTION OF PREFERRED EMBODIMENTS

Figure 1:
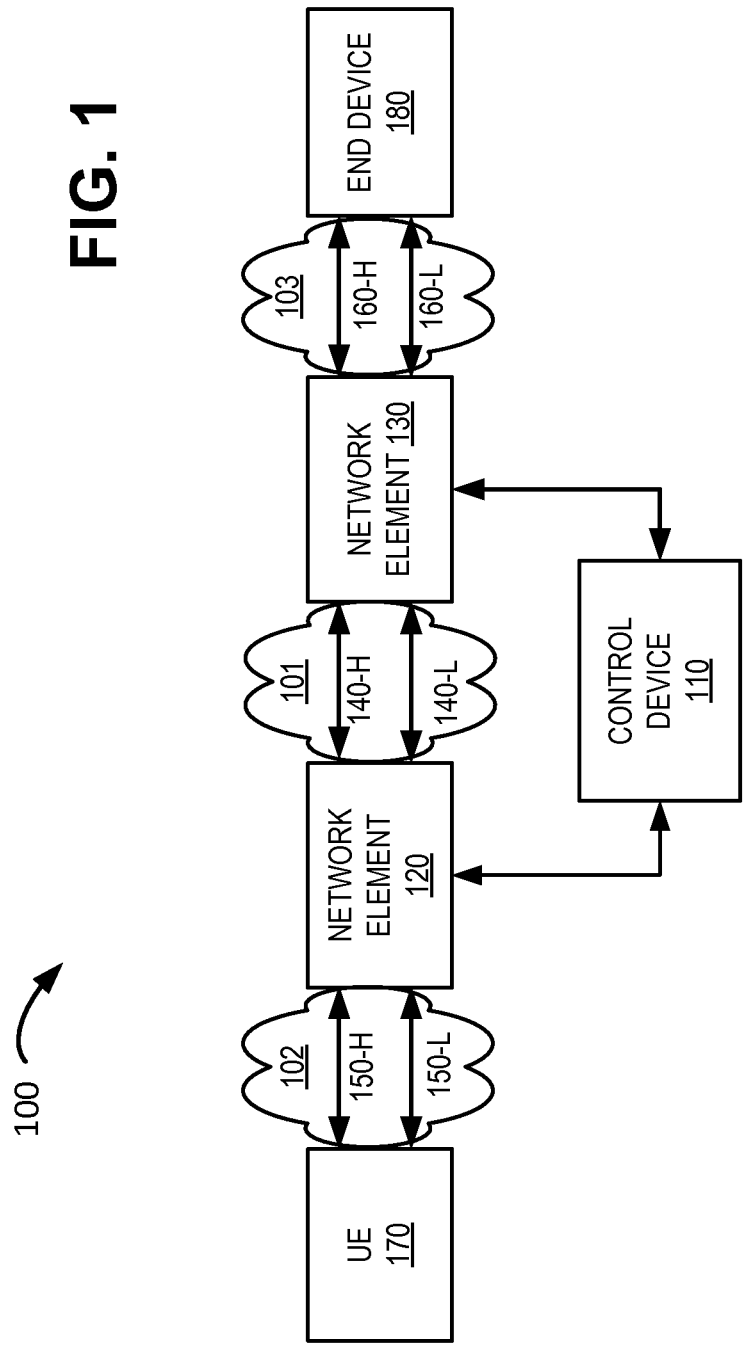
FIG. 1 illustrates an exemplary environment in which systems and methods described herein may be implemented.

The following detailed description refers to the accompanying drawings. The same reference numbers in different drawings may identify the same or similar elements.

Systems and methods described herein may enable service level agreement (SLA) based monitoring and configuration of a pathway for transmission of data. For example, data may be transmitted via a network element that is associated with both a high bandwidth pathway and a low bandwidth pathway. An SLA associated with the data may be identified based on, for example, attributes of the data, and transmission requirements associated with the SLA may be determined. A controller may determine a status of the network element, such as occupancy of queues included in the network element, and the controller may use the status of the network element to select either the high bandwidth pathway or the low bandwidth pathway. For example, the controller may estimate a transmission delay associated with the determined occupancy and use the estimated transmission delay to select between the high bandwidth pathway and the low bandwidth pathway.

For example, the controller may direct the network element to change a quality of service (QoS) or other attribute associated with the data to cause the network element to transmit the data using the selected one of the high bandwidth pathway or the low bandwidth pathway. The controller may select one of the high bandwidth pathway or the low bandwidth pathway so transmission of the data complies with the SLA requirements while minimizing use of network resources.

In one implementation described herein, the SLAs requirements may be met by computing a queue drain rate and the buffer length. For example, if a physical interface has a bandwidth of 100 bits/sec and two queues, a high priority queue that has 90% weight and a buffer length of 1 bit, and a low priority queue that has a 10% weight and a buffer length of 10,000 bits, compliance of the SLA may be determined based on the respective drain rates (or bandwidths) and buffer lengths. In this example, in every time slot or period, a high priority service (e.g., a user assigned to the high priority queue) may be guaranteed a bandwidth of 90 bits within 1 sec, with an upper latency bound of 1 bit/90 bits/sec, or 0.011 seconds. Continuing with this example, a low priority service (e.g., a user assigned to the low priority queue) may be guaranteed to receive 10 bits within 1 sec, but with an upper bound latency of 10,000 bits/10 bits/sec, or 100 seconds. Thus, the high priority service in this example may be served within 0.011 seconds, or even potentially lower if the low priority queue is empty, whereas a low priority service may be associated with a delay of up to 100 seconds. Thus, services may be provisioned to satisfy SLA requirements based on interface speeds, queue lengths and buffer weights.

Moreover, SLA requirements that can be reliably achieved and offered end-to-end (e.g., over air, optical, and data networks) can be determined, and costs for achieving SLA requirements may be accurately estimated.

FIG. 1 is a block diagram of an exemplary environment 100 in which systems and methods described herein may be implemented. Environment 100 may include a control device 110 that receives status information from network elements (NEs) 120 and 130 and may provide control information to NEs 120 and 130. NEs 120 and 130 may communicate via a channel through first network 101 that includes high bandwidth pathway 140-H and low bandwidth pathway 140-L. Furthermore, NE 120 may communicate with a user equipment (UE) 170 via a channel though second network 102 that includes high bandwidth pathway 150-H and low bandwidth pathway 150-L. NE 130 may communicate with an end device 180 via a channel though third network 103 that includes high bandwidth pathway 160-H and low bandwidth pathway 160-L.

Networks 101, 102, and 103 may include a local area network (LAN), a wide area network (WAN), a metropolitan area network (MAN), a telephone network, such as the Public Switched Telephone Network (PSTN), an intranet, the Internet, an optical fiber (or fiber optic)-based network, a cable television network, a satellite television network, or a combination of networks. Networks 101, 102, and 103 may correspond to different types of networks. In one implementation, network 101 may correspond, for example, to a radio area network (RAN), network 102 may include an internet protocol (IP) core network, and network 103 may include a packet data network (PDN). However, it should be appreciated that NEs 120 and 130 may connect to, and interconnect, any type of networks 101, 102, and 103.

Control device 110 may be a computer device that monitors the status of NEs 120 and 130 with respect to exchanging data between UE 170 and end device 180. Control device 110 may identify a service level agreement (SLA) associated with the data. For example, control device 110 may identify a subscriber associated with the data and determine an SLA associated with the subscriber. For example, control device 110 may access subscriber records to identify the SLA associated with the subscriber. The SLA may identify performance metrics, or requirements, associated with the subscriber, such as a maximum transit time (or delay), a maximum amount of jitter, a maximum number of drop packets, and/or a minimum bandwidth.

Control device 110 may forward control information to configure the operation of NEs 120 and 130 based on the status of NEs 120 and 130 and the SLA requirements. For example, control device 110 may determine levels of congestion at NEs 120 and 130 and may select among pathways 140-H, 140-L, 150-H, 150-L, 160-H, and 160-L based on the associated level of congestion. Control device 110 may determine a transmission path from high bandwidth pathways 140-H, 150-H, and 160-H and low bandwidth pathways 140-L, 150-L, and 160-L such that the transmission of the data satisfies the performance metrics associated with the SLA while minimizing resource usage. For example, control device 110 may use low bandwidth pathways 140-L, 150-L, and 160-L when possible (i.e., may use low bandwidth pathways as its default setting), and may switch to high pathways 140-H, 150-H, and 160-H only to an extent needed to satisfy the performance metrics associated with the SLA.

NEs 120 and 130 may include one or more data transfer devices, such as a mobile gateway, a router, a switch, a firewall, a network interface card (NIC), a hub, a bridge, a proxy server, an optical add-drop multiplexer (OADM), or some other type of device that processes and/or transfers data. In one example, NEs 120 and 130 may route data (such as packets or portions of packets) from a wireless network, e.g., network 101 connecting UE 170 to a base station (not illustrated).

In one implementation, control device 110, or a portion thereof, may be included as a component of and/or connected to NE 120 and/or 130. For example, control device 110 may be a component of NE 120 that monitors and sends control information to NE 130.

In an exemplary implementation, NEs 120 or 130 may represent a switch, such as a layer 2 switch, that is used to transmit or forward traffic to other devices in a network. In one implementation, NEs 120 or 130 may represent an external network to network interface (ENNI). That is, NEs 120 and 130 may represent the interface between a networks and external devices/network. NEs 120 and 130 may include edge ports (not shown) used to forward and receive data from other devices via high bandwidth pathway 140-H, 150-H, and 160-H and low bandwidth pathway 140-L, 150-L, and 160-L. NEs 120 and 130 may exchange traffic to each other and/or to other devices such as UE 170 and/or end device 180.

NEs 120 and 130 may each be positioned as a "bump-in-the-wire" in networks 101, 102, and 103 located between devices, such as UE 170 and end device 180. In an exemplary implementation, NEs 120 and 130 may demarcate the boundary between a service provider's administrative domain or network and the customer's administrative domain or network. In such an implementation, NEs 120 and 130 may be located at the "handoff" from the service provider to the customer. For example, NE 120 may represent a customer's edge device (e.g., a device located at a point where the customer's network interfaces with an external network), and NE 130 may represent a service provider's edge device (e.g., a device located at a point where the service provider's network interfaces with a customer's network).

High bandwidth pathways 140-H, 150-H, and 160-H and low bandwidth pathways 140-L, 150-L, and 160-L may include, for example, wired, wireless, and/or optical transmission media coupling UE 170 and end device 180 via networks 101, 102, and 103. For example, high bandwidth pathways 140-H, 150-H, and 160-H and low bandwidth pathways 140-L, 150-L, and 160-L may combine with NEs 120 and 120 to act as a logical connection for routing data between network UE 170 and end device 180.

In an exemplary implementation, pathways 140-L and 140-H may function as a management link and allow NEs 120 and 130 to exchange control information. For example, NEs 120 and 130 may exchange information via pathways 140-L and 140-H to synchronize transmission of data between UE 170 and end device 180.

UE 170 may include any device that is capable of communicating via network 102. For example, UE 170 may include a mobile computation and/or communication device, such as a personal communications system (PCS) terminal (e.g., that may combine a cellular radiotelephone with data processing and data communications capabilities), a personal digital assistant (PDA) (e.g., that can include a radiotelephone, a pager, Internet/intranet access, etc.), a wireless device, a smart phone, a laptop computer (e.g., with a wireless air card), a global positioning system (GPS) device, a content recording device (e.g., a camera, a video camera, etc.), etc. In another example, UE 170 may include a fixed (e.g., provided in a particular location, such as within a subscriber's home) computation and/or communication device, such as a laptop computer, a personal computer, a tablet computer, a set-top box (STB), a television, a gaming system, etc.

End device 180 may include any device that is capable of communicating via network 103. For example, end device 180 may include a computing and/or communication device such as a server (e.g., an application server), a PCS terminal (e.g., that may combine a cellular radiotelephone with data processing and data communications capabilities), a PDA (e.g., that can include a radiotelephone, a pager, Internet/intranet access, etc.), a wireless device, a smart phone, a laptop computer (e.g., with a wireless air card), a GPS device, a content recording device (e.g., a camera, a video camera, etc.), etc.

The network configuration illustrated in FIG. 1 is provided for simplicity. It should be understood that a typical environment 100 may include more or fewer components. For example, environment 100 may include more NEs 120 and 130, such as internetwork NEs and/or NEs 120 and 130 connecting additional networks 101. Environment 100 may also include additional elements, such as gateways, routers, monitoring systems, etc., that aid in routing and monitoring traffic.

Figure 2:
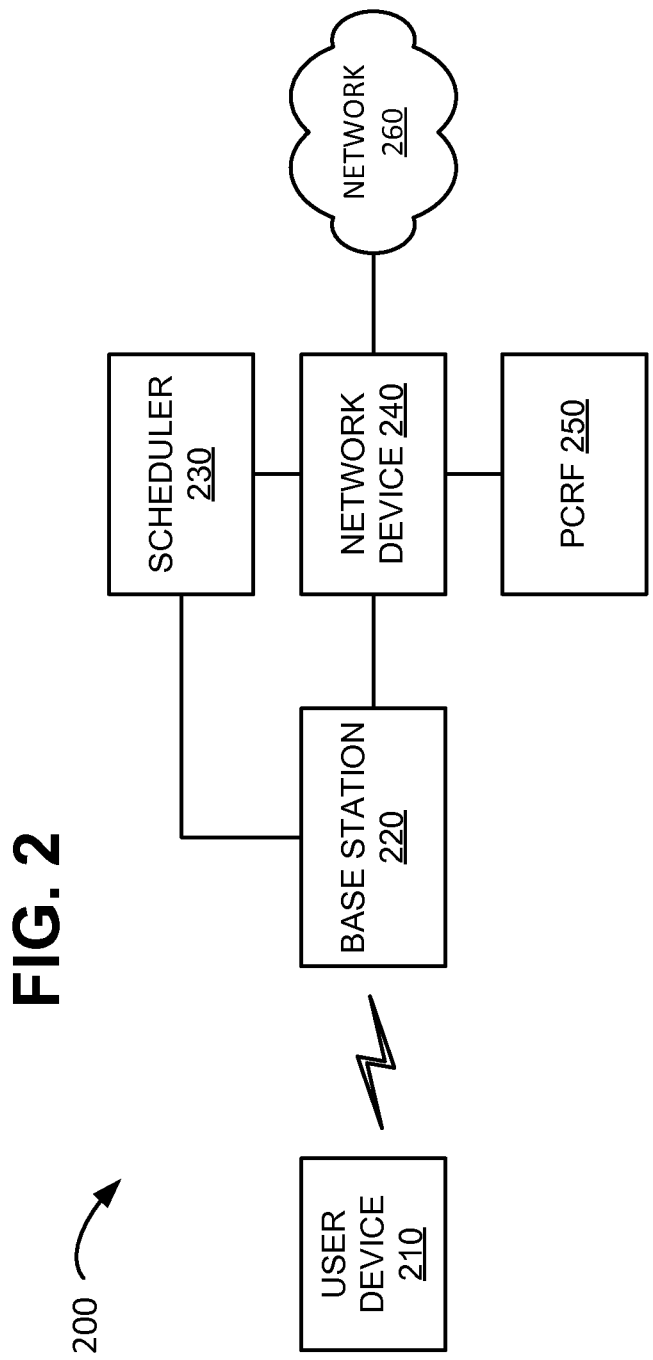
FIG. 2 illustrates an exemplary wireless network 200 that may be included in the environment of FIG. 1.

FIG. 2 is a diagram of an exemplary wireless network 200 that may be included in a portion of environment 100. As illustrated, network 200 may include a user device 210, a base station 220, a mobility management entity (MME) or scheduler 230, a network device 240, a policy and charging rules function (PCRF) 250, and a network 260. Components of network 200 may interconnect via wired and/or wireless connections.

User device 210 may correspond to UE 170 or end device 180. User device 210 may include, for example, any device that is capable of communicating with network 260 via an IP wireless access network (e.g., provided by base station 220 in combination with MME 230 and/or network device 240).

Base station 220 may include one or more computation and/or communication devices that receive voice and/or data from MME 230 and/or network device 240 and wirelessly transmit the voice and/or data to user device 210. Base station 220 may also include one or more devices that wirelessly receive voice and/or data from user device 210 and transmit that voice and/or data to one of MME 230, network device 240, and/or other user devices 210 (not shown). In implementations herein, base station 220 may enforce QoS constraints due to congestion in the wireless IP access network. In some cases, base station 220 may also be referred to as an eNodeB or an enhanced node B.

In one example implementation, base station 220 may receive from control device 110, a subscriber bearer policy associated with user device 210 that includes, for example, a particular QoS class identifier (QCI) value. Based on the QCI value, base station 220 may calculate and then provide a bandwidth allocation to user device 210 to rate limit the traffic (e.g., during periods of network congestion).

MME 230 may include one or more computation and/or communication devices that provide a convergence point between wireless protocols (e.g., associated with user device 210 and/or base station 220) and IP protocols (e.g., associated with PCRF 250 and network 260). MME 230 may be involved in a bearer activation/deactivation process (e.g., for user device 210) and may choose a network device 240 for user device 210 at an initial attachment and/or handover.

Network device 240 may correspond to NE 120, 130 and may include one or more data transfer devices, such as a mobile gateway, a router, a switch, a firewall, a network interface card (NIC), a hub, a bridge, a proxy server, an optical add-drop multiplexer (OADM), or some other type of device that processes and/or transfers data. In one example, network device 240 may route packets (or portions of packets) from a wireless network (e.g., user device 210 and base station 220) to another network (e.g., network 260).

In one example implementation, network device 240 may receive (e.g., from PCRF 250) a policy configuration (e.g., that includes a QCI, a downlink data rate limit, and an uplink data rate limit) for a subscriber and/or an application service associated with user device 210, and may provide the policy configuration to base station 220.

In one example, base station 220, MME 230, and/or network device 240 may provide an all IP wireless access network for user device 210. The IP wireless access network, in one implementation, may correspond to a 4G network, a Long Term Evolution (LTE) network, an advanced LTE network, etc. The LTE network may include a communications network that connects subscribers (e.g., user device 210) to another device (e.g., within network 260). In another implementation, the IP wireless access network may include a WiFi network or other access networks (e.g., an enhanced high-rate packet data (eHRPD) network or a WiMax network). In other implementations, the wireless access network may include a wireless network other than an IP wireless access network.

PCRF 250 may correspond to control device 110 and may include, for example, one or more computation or communication devices that may provide policy control decision and flow based charging control functionalities in response to SLA requirements associated with user device 210. PCRF 250 may provide network control regarding service data flow detection, gating, QoS and flow based charging, etc. PCRF 250 may determine how a certain service data flow shall be treated, and may ensure that user plane traffic mapping and treatment are in accordance with a user's subscription profile.

In one implementation, PCRF 250 may receive (e.g., from a network administrator, not shown) a policy configuration for subscribers and/or application services provided by the IP wireless access network (e.g., provided by base station 220 in combination with network device 240). The subscriber policy configuration may define rate limits associated with subscribers of the IP wireless access network. For example, the subscriber policy configuration may include a QoS level (e.g., the QCI value), the maximum downlink bit rate, and the maximum uplink bit rate. The subscriber policy configuration may include a value (e.g., in Mbps) that identifies a rate limit, for a particular subscriber or class of subscribers, to an access point, such as network 260 based on an SLA associated with the subscriber or class of subscribers. For example, if a first subscriber pays a higher fee than a second subscriber for services provided by the IP wireless access network, then the subscriber policy configuration may allocate more resources of the IP wireless access network to the first subscriber than to the second subscriber.

Network 260 may include a local area network (LAN), a wide area network (WAN), a metropolitan area network (MAN), a telephone network, such as the Public Switched Telephone Network (PSTN), an intranet, the Internet, an optical fiber (or fiber optic)-based network, a cable television network, a satellite television network, or a combination of networks. In one implementation, network 260 may include an IP core network and/or one or more packet data networks (PDNs).

Although FIG. 2 shows example components of network 200, in other implementations, network 200 may include fewer components, different components, differently arranged components, and/or additional components than those depicted in FIG. 2. Alternatively, or additionally, one or more components of network 200 may perform one or more other tasks described as being performed by one or more other components of network 200.

Figure 3:
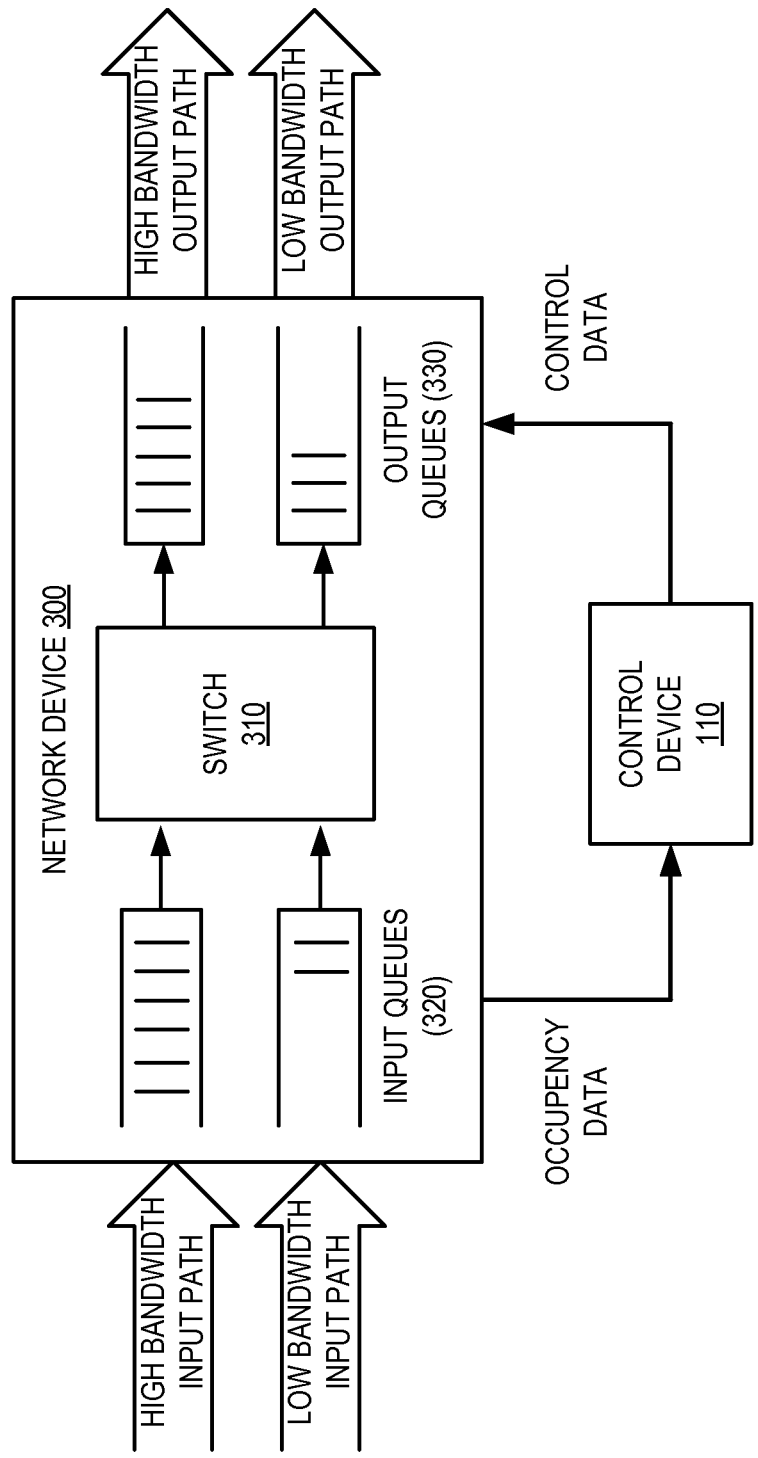
FIG. 3 illustrates exemplary components that may be included in a network element included in the environment of FIG. 1.

FIG. 3 illustrates an exemplary configuration of device 300 that may correspond to network element 120, 130 and/or network device 240. Device 300 may include, for example, a switch 310, input queues 320, and output queues 330.

Switch 310 may include components that connect and exchange data between input queues 320 and output queues 330. Input queues 320 may include, for example, a first input queue associated with a high bandwidth input path and a second input queue associated with a low bandwidth input path. The high bandwidth input path and the low bandwidth input path may be associated with an input connection between device 300 and another device (not shown). For example, high QoS traffic may be transmitted by the high bandwidth input path, and the low QoS traffic may be transmitted by the low bandwidth input path. The high bandwidth input path may be associated with a first fraction (e.g., 90%) of a total bandwidth available on the input connection, and the low bandwidth input path may be associated with a second, smaller fraction (e.g., 10%) of the total bandwidth. To accommodate the higher bandwidth input path, the first input queue 320 may be relatively larger (suggested by showing six traffic lines) than the second input queue 320 (suggested by showing only two traffic lines).

Output queues 330 may include, for example, a first output queue associated with a high bandwidth output path and a second output queue associated with a low bandwidth output path. For example, the high bandwidth output path and the low bandwidth output path may be associated with an output connection between device 300 and another device (not shown). For example, high QoS traffic may be transmitted by the high bandwidth output path, and the low QoS traffic may be transmitted by the low bandwidth output path. The high bandwidth output path may be associated with a first fraction (e.g., 90%) of a total bandwidth available on the output connection, and the low bandwidth input path may be associated with a second, smaller fraction (e.g., 10%) of the total output bandwidth. To accommodate the higher bandwidth output path, the first output queue 330 (shown with five traffic lines) may be relatively larger than the second output queue 330 (shown with only three traffic lines).

In operation, data received by device 300 (e.g., through the high bandwidth input path and/or the low input bandwidth path) may be stored to input queues 320, transferred via switch 310 to output queues 330, read from output queues 330, and outputted from device 300 (e.g., through the high bandwidth output path and/or the low output bandwidth path). During times of congestion, data may be written to input queues 320 and/or output queues 330 faster than the data is outputted from device 300 (e.g., via the high bandwidth output path and/or the low output bandwidth path). In other words, data may be stored by input queues 320 and/or output queues 330 during a time period, because data is being written to the input queues 320 and/or output queues 330 faster than data is being read/removed. The occupancy (e.g., the portion of the queue storing data throughout the time period) of input queues 320 and/or output queues 330 may reflect an amount of congestion associated with device 300.

In one implementation, device 300 may forward status information (e.g., data regarding occupancy of input queues 320 and/or output queues 330) to control device 110. Control device 110 may determine control data based on the status information and may forward the control data to device 300. For example, control device 110 may determine a delay associated with the congestion at device 300 and forward instructions to alter a QoS associated with received data if the delay would cause transmission of the data via device 300 to fail to comply with SLA requirements. Control device 110 may reduce a QoS associated with data, thereby causing the data to be stored to be outputted from output queues 330 via a low bandwidth output path if, for example, the data is transmitted faster than required by an SLA. Control device 110 may increase the QoS associated with the data, thereby causing the data to be stored to be outputted from output queues 330 via a high bandwidth output path if, for example, the data is transmitted slower than required by an SLA. Similarly, control device 110 may change the QoS associated with data based on other SLA factors, such as the number of dropped packets, a bandwidth available to a subscriber, jitter, etc.

Although FIG. 3 shows example components of device 300, in other implementations, device 300 may include fewer components, different components, differently arranged components, and/or additional components than those depicted in FIG. 3. For example, device 300 may include input ports coupling the input paths to input queues 320 and output ports coupling the output queues 330 to output paths. Alternatively, or additionally, one or more components of device 300 may perform one or more other tasks described as being performed by one or more other components of device 300.

Figure 4:
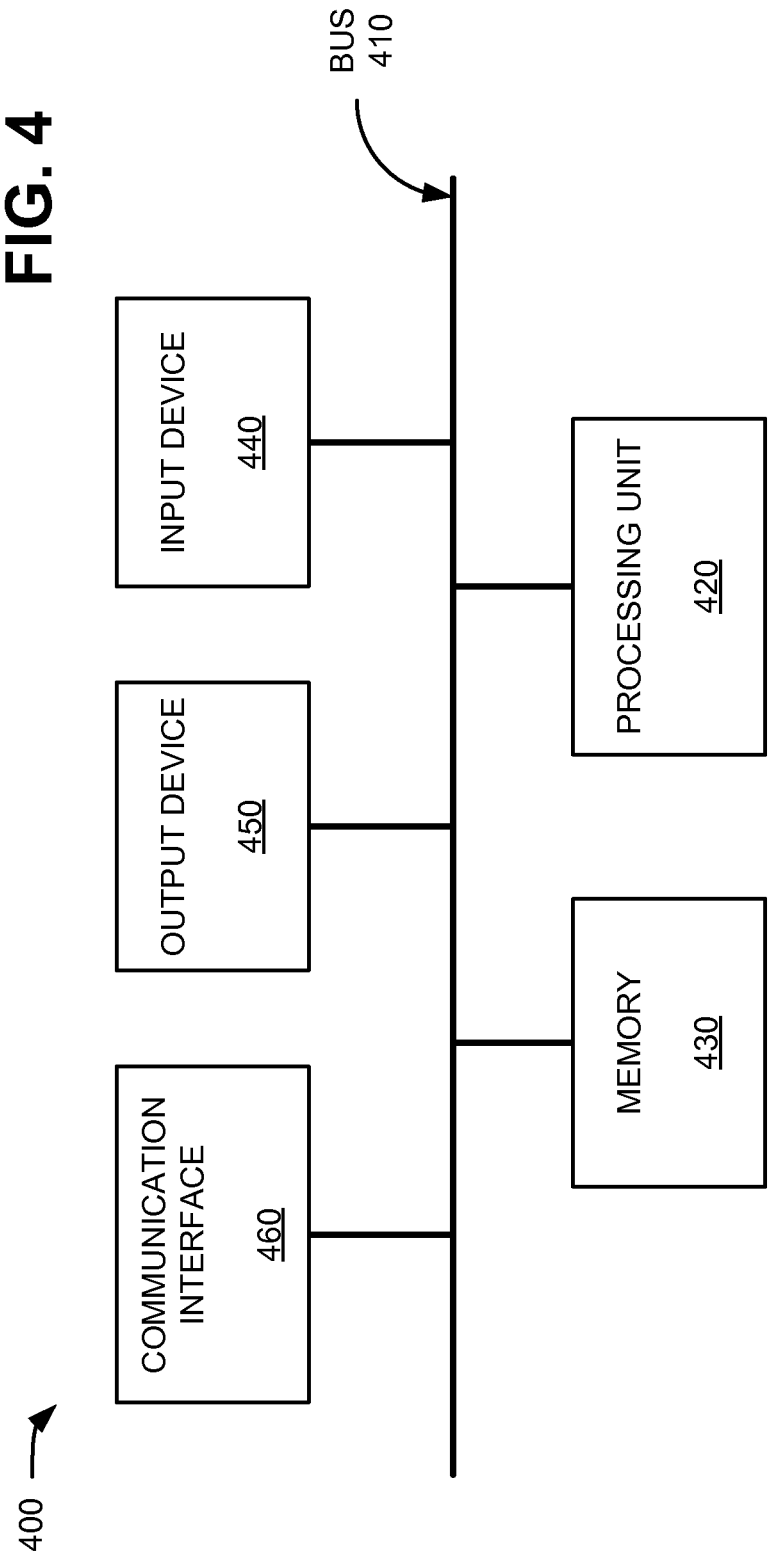
FIG. 4 illustrates exemplary components that may be included in a device included in the environment of FIG. 1 and/or the wireless network of FIG. 2.

FIG. 4 is a diagram of exemplary components of a device 400 in one implementation that may correspond, for example, to one of control device 110, NEs 120 or 130, UE 170 and/or end device 180 or correspond to or be included in other components of environment 100, network 200, or device 300. One or more of components included in device 400 may be implemented and/or installed as software, hardware, or a combination of hardware and software. As shown in FIG. 4, device 400 may include, for example, a bus 410, a processing unit 420, a memory 430, an input device 440, an output device 450, and a communication interface 460.

Bus 410 may permit communication among the components of device 400. Processing unit 420 may include one or more processors or microprocessors that interpret and execute instructions. In other implementations, processing unit 420 may be implemented as, or include, one or more application specific integrated circuits (ASICs), field programmable gate arrays (FPGAs), and/or the like.

Memory 430 may include a random access memory (RAM) or another type of dynamic storage device that stores information and instructions for execution by processing unit 420, a read only memory (ROM), electrical erasable permanent memory (Flash) or another type of static storage device that stores static information and instructions for the processing unit 420, and/or some other type of magnetic or optical recording medium and its corresponding drive for storing information and/or instructions.

Input device 440 may include a device that permits an operator to input information to device 400, such as a keyboard, a keypad, a mouse, a pen, a microphone, one or more biometric mechanisms, and the like. Output device 450 may include a device that outputs information to the operator, such as a display, a speaker, etc.

Communication interface 460 may include a transceiver that enables device 400 to communicate with other devices and/or systems. For example, communication interface 460 may include mechanisms for communicating with other devices, such as other devices of environment 100.

As described herein, device 400 may perform certain operations in response to processing unit 420 executing software instructions contained in a computer-readable medium, such as memory 430. A computer-readable medium may include a tangible, non-transitory memory device. A memory device may include space within a single physical memory device or spread across multiple physical memory devices. The software instructions may be read into memory 430 from another computer-readable medium or from another device via communication interface 460. The software instructions contained in memory 430 may cause processing unit 420 to perform processes described herein. Alternatively, hardwired circuitry may be used in place of or in combination with software instructions to implement processes described herein. Thus, implementations described herein are not limited to any specific combination of hardware circuitry and software.

Although FIG. 4 shows exemplary components of device 400, in other implementations, device 400 may include fewer components, different components, differently arranged components, or additional components than those depicted in FIG. 4. Furthermore, it should be appreciated that tasks described as being performed by two or more other components of device 400 may be performed by a single component, and tasks described as being performed by a single component of device 400 may be performed by two or more components.

FIG. 5 shows a table 500 that may be stored by control device 110 in an implementation. Table 500 may include, for example, an identifier field 510, a features field 520, and associated key performance indicators (KPIs) field 530. SLA identifier field 510 may store an identifier associated with an SLA. For example, SLA identifier field 510 may include an alphanumeric identifier associated with the SLA (e.g., SLA 1; SLA 2; SLA3). SLA identifier field 510 may include data (not shown) identifying a subscriber and/or a particular UE 170 associated with the SLA. For example, the SLA identifier may include information identifying a network address associated with the subscriber, an organization associated with the subscriber, and/or a particular UE 170 associated with the subscriber (such information not shown).

Identifying features field 520 may store data identifying features associated with the SLAs identified in field 510. Identifying features field 520 may include information that control device 110 may use to identify an SLA associated with data exchanged via NEs 120 and/or 130. For example, as shown in table 500, identifying features field 520 may identify a network address (i.e., an IPv4 address such as 123.456.0.0 or an IPv6 address) or range of address (e.g., an address associated with an application server or client device associated with the subscriber), a data format (e.g., values included in one or more fields included in a header of packets associated with the subscriber), and/or a uniform resource locator (URL) or web address associated with the SLA. Identifying features field 520 may further identify other attributes associated with the SLA, such as identifying an application (not shown) associated with the SLA.

Associated KPIs field 530 may store information identifying KPIs associated with an SLA. The KPIs identified in associated KPIs field 530 may identify contractual performance obligations associated with an SLA. As shown in table 500, associated KPIs field 530 may store information identifying, for example, a maximum transit time (or delay of less than or equal to 0.5 seconds), a maximum percentage of dropped packets of less than or equal to 0.5%, and/or a minimum bandwidth of greater than or equal to 10 megabytes/second associated with an SLA 2 or a minimum bandwidth of greater than or equal to 20 megabytes/second, associated with an SLA 3.

FIG. 6 is a flow chart of an exemplary process 600 for SLA-based provisioning and service management according to an implementation described herein. In one implementation, process 600 may be performed by control device 110. In another implementation, some or all of process 600 may be performed by control device 110 in conjunction with one or more other devices. Process 600 is described with reference to components in FIGS. 1-4, discussed above.

As shown in FIG. 6, process 600 may include determining features associated with data received at NEs 120 and/or 130 (block 610) and identifying an SLA associated with the data based on the identified features (block 620). For example, control device 110 may determine that data is received from UE 170 and or/is intended for UE 170. Control device 110 may receive a copy of the data from NEs 120 and/or 130 (e.g., NE 120 and/or 130 may sample the data) or may receive information identifying the features from NE 120 and/or 130. In block 620, control device 110 may identify an SLA that corresponds to features associated with the data. For example, control device 110 may compare the features associated with the data to identifying features stored in identifying features field 520. In the example of FIG. 5, control device 110 may determine whether the data corresponds to a network address or range of address, a data format, and/or a URL or web address associated with an SLA.

Continuing with process 600 in FIG. 6, control device 110 may identify a path for the data (block 630) and may identify NEs 120 and/or 130 included in the path (block 640). For example, control device 110 may receive routing data or other information identifying the path for the data. For example, controller 110 may receive routing table from NEs 120 and/or 130, and identifying particular NEs 120 and/or 130 routing the data.

In one implementation, control device 110 may identify particular types of NEs 120 and/or 130. For example, control device 110 may identify NEs 120 and/or 130 associated with and of particular importance to particular types of SLA requirements. For example, control device 110 may identify NEs 120 and/or 130 associated with wireless communications when the SLA requirements relate to wireless transmissions (e.g., a number of UEs 170 that can connect to a base station, average signal strength, etc.). Control device 110 may further focus on NEs 120 and/or 130 associated with wireless communications with respect to other types of SLA requirements. For example, transmission delays for NEs 120 and/or 130 associated with wireless network may be significantly higher than delays associated with NEs 120 and/or 130 in wired/optical networks due to the relatively lower bandwidths in the wireless bandwidths. Thus, control device 110 may achieve an SLA requirement associated with transmission delay by monitoring and controller only NEs 120 and/or 130 associated with wireless network.

In another implementation, control device 110 may cause the data to be routed through NEs 120 and/or 130 receiving control information from control device 110. For example, control device 110 may cause data between UE 170 and end device 180 to be routed via one or more networks that are monitored by control device 110. For example, control device 110 may cause NE 120 to direct traffic to NE 130 and away from other components that are not monitored by control device 110.

Control device 110 may determine the status of the identified NEs 120 and/or 130 (block 650), and control device 110 may estimate compliance of transmission of the data with the SLA requirements based on the status of the NEs 120 and/or 130 (block 660). For example, control device 110 may determine the occupancy of the queues in NEs 120 and/or 130 in block 650. Control device 110 may use the occupancy of the queues in NEs 120 and/or 130 to determine whether transmission of the data along the path complies with the SLAs requirements in block 660.

In one implementation, the status of NEs 120 and/or 130 may be determined in block 650 based on a measurement during a particular time period. In another implementation, the status of the identified NEs 120 and/or 130 may be determined in block 650 based on measurements over multiple time periods. For example, the status may be associated with an average, a median, a mean, a mode (i.e., most common measured value), a standard deviation, etc. of status values measured over multiple time periods. In another implementation, the status for a time period may be predicted using statistical analysis of measurements during other time periods (e.g., using Markov chain analysis).

Continuing with process 600 in FIG. 6, control device 110 may configure transmission of data via NEs 120 and/or 130 based on estimated compliance with the SLA (block 670). Control device 110 may change a QoS associated with the data if transmission of the data does not comply with the SLA. For example, control device 110 may increase the priority of the data so that the data is more likely to be transmitted by a high bandwidth pathway associated with a lower transmission delay.

FIG. 7 is a flow chart of an exemplary process 700 for configuring the NEs 120 and/or 130 in block 670 according to an implementation described herein. In one implementation, process 700 may be performed by control device 110. In another implementation, some or all of process 700 may be performed by control device 110 in conjunction with one or more other devices shown or not shown in FIGS. 1-4. Process 700 is described with reference to components in FIGS. 1-4, described above.

Process 700 in FIG. 7 may include estimating a KPI value based on the status of the NEs 120 and/or 130 in block 650 (block 710) and determining whether the estimated KPI satisfies the SLA requirements (block 720). For example, control device 110 may use occupancy data to determine whether transmission of the data via NEs 120 and/or 130 complies with a maximum transmission time (or delay) associated with an SLA.

In one implementation, control device 110 may use the occupancy data of queues in a particular NE 120 to determine an estimated transmission delay (D) associated with the particular NE 120. For example, control device 110 may determine D based on occupancy (O) and output bandwidth (BW) using expression 1.

$$D = \frac{O}{BW} \quad \text{(Expression 1)}$$

For example, if the particular NE 120 is associated with a high bandwidth queue occupancy of 9 megabits (Mb) and a high bandwidth channel of 9 Mb per second (Mbps), the particular NE 120 may be associated with a high bandwidth path delay of 9÷9, or 1 second. Similarly, if the particular NE 120 is associated with a low bandwidth queue occupancy of 3 Mb and a low bandwidth channel of 1 Mbps, the particular NE 120 may be associated with a low bandwidth path delay of 3÷1, or 3 seconds.

In one implementation, control device 110 may not receive status information from and/or provide control information to a particular NEs 120. For example, the particular NE 120 may be associated with a different service provider or associated with a closed network (e.g., a virtual private network) that does not accept external control signals. In this implementation, control device 110 may estimate performance aspects associated with the particular NE 120. For example, control device 110 may indirectly determine the performance aspects, such as transmission delays, based on monitoring transmission of data via the particular NE 120 in block 710.

In another implementation, control device 110 may estimate the KPI in block 710 based on a subset of a total path associated with a user. For example, the KPI may be estimated based on a particular quantity of the lowest bandwidth channels (e.g., the channels associated with the lowest queue drain rates) since these channels may be associated with the longest possible delays. In the example shown in FIG. 1, a total transmission time associated with delivering data between UE 170 and end device 180 may be determined, for example, based on evaluating queuing delays associated with a RAN between UE 170 and network element 120 if, for example, delays associated with network 101 (e.g., an optical network) and 103 (e.g., an IP core network) are significantly less. In this way, compliance with SLA requirements related to transmission times may be estimated based on a slowest (e.g., lowest bandwidth) portion of a total pathway between the endpoints. Similarly, if the SLA requirements relates reliability or noise, the relevant KPIs may be estimated based on a least reliable (e.g., high number of dropped packets) portion of a total pathway between the endpoints.

If the estimated KPI does not satisfy the SLA requirements (block 720—No), control device 110 may route the data using a fast (i.e., high bandwidth) pathway (block 730). For example, control device 110 may cause the particular NE 120 to rewrite a header value associated with the data to increase a QoS associated with data. Rewriting the header value may cause particular NE 120 or other NEs 120/130 to transmit the data using larger input queues 320 and/or output queues 330.

In one implementation, one of NEs 120 or 130 may not accept control information from control device 110. In the above example in which the particular NE 120 is associated with a different service provider or is associated with a closed network (e.g., a virtual private network), the particular NE 120 may not accept external control signals from control device 110. In this example, control device 110 may attempt to achieve the SLA requirements by modifying portions of the communications path between UE 170 and end device 180 that are associated with other NEs 120 and/or 130 that do accept control instructions from control device 110. For example, if the particular NE 120 (that does not accept external control signals) is associated with an estimated transmission delay of 1 second, and the SLA is associated with a maximum transmission delay of 4 seconds, control device 110 may attempt to control the other NEs 120 and/or 130 such a remaining portion of the communication path has an estimated transmission delay of 3 seconds.

Furthermore or in addition, control device 110 may configure NEs 120 and/or 130 to modify other traffic in order to reduce a transmission time or satisfy another transmission requirement associated with the SLA. For example, control device 100 may cause NEs 120 and/or 130 to route the other traffic via a slow (i.e., lower bandwidth) path. For example, NEs 120 and/or 130 may decrease the QoS of the other traffic (e.g. reducing a QCI value for the other traffic). In this example, if data associated with a subscriber is already being transmitted via the fast pathway, a requirement associated with subscriber may be achieved by shifting resources to transmission associated with the subscriber.

Control device 110 may estimate whether the SLA requirements would be satisfied based on the using the fast pathway (block 740). If the SLA requirements would not be satisfied even using the fast pathway (block 740—No), control device 110 may reroute transmission of the data via a different pathway (block 750). For example, control device 110 may the reroute the data to a different NE 120 and/or 130. For example, if data routed over a particular air channel via base station 220 does not conform to SLA requirements, the data may be rerouted for transmission via a different channel or communications protocol (e.g., using wifi communications or wired communications).

In another implementation, control device 110 may send control information to change configuration of NE 120 and/or 130. For example, control device 110 may instruct NE 120 and/or 130 to change the size of queue 320 or 330 to reduce a transmission delay or increase the size of queue 320 or 330 to reduce jitter and/or dropped packets.

Furthermore or in addition, control device 110 may configure NEs 120 and/or 130 to modify other traffic in order to reduce a transmission time or satisfy another transmission requirement associated with the SLA. For example, control device 100 may cause NEs 120 and/or 130 to route the other traffic via the slow path to allocate sufficient resources (e.g., queue space, for storage and transmission of data associated with the subscriber.

Continuing with process 700 in FIG. 7, if the estimated KPI satisfies the SLA (block 720—yes), control device 110 may determine whether the estimated KPI exceeds the SLA requirements (block 760). For example, control device 110 may determine whether the estimated KPI exceeds the SLA requirements by more than a threshold amount.

If the estimated KPI exceeds the SLA requirements (block 760—Yes), control device 110 may cause the data to reroute to the slow channel (block 770). For example, control device 110 may cause the particular NE 120 to rewrite a header value associated with the data to decrease a QoS associated with data, such as reducing a QCI value associated with the data. Rewriting the header value may cause particular NE 120 or other NEs 120/130 to transmit the data using smaller input queues 320 and/or output queues 330.

Furthermore or in addition, control device 110 may configure NEs 120 and/or 130 to modify other traffic (i.e., traffic that is not associated with the subscriber) in block 770. For example, control device 100 may cause NEs 120 and/or 130 to route the other traffic via the fast path. For example, NEs 120 and/or 130 may increase the QoS of the other traffic (e.g.

reducing a QCI value for the other traffic). Shifting resources to transmission of the other traffic may increase transmission delays associated with the subscriber's data.

If the estimated KPI does not exceed the SLA requirements (block 760—No), control device 110 may transmit the data using a current NE configuration (block 780). For example, the data may be transmitted using a current QoS or associated value associated with the data.

An example of SLA-based provisioning and management is now discussed with respect to FIG. 1. In this example data is transmitted between UE 170 and end device 180 (e.g., a video stream to UE 170 from a content server functioning as end device 180). In this example, control device 110 may detect that a path is being established for the video stream, and at least a portion of the transmission is over an air channel (e.g., UE 170 is a wireless device).

Control device 110 may receive an indication from NE 120 or 130 regarding a communication between UE 170 and end device 180 related to the stream (e.g., a request for the stream, an acknowledgement of the request, a request to establish a session, a first few packets in the stream, etc.). Control device 110 may identify an SLA for a subscriber associated with UE 170 and/or end device 180 and determine a performance requirement associated with the SLA. For example, control device 110 may identify a maximum acceptable transmission delay associated with data in the stream. Control device 110 may further identify each of the NEs 120 and 130 in a communications path between UE 170 and end device 180 for the stream.

Control device 110 may identify respective statuses of the NEs 120 and 130 in the communications paths. For example, control device 110 may determine occupancy levels of each of the identified NEs 120 and 130. Control device 110 may estimate compliance with the performance requirement based on the respective statuses. For example, control device 110 may predict a transmission delay associated with traversing the entire path between UE 170 and end device 180 by evaluating the occupancies at each of the NEs 120 and 130 along the path. For example, using expression 1, control device 110 may estimate a transmission delay associated with a particular NE 120 or 130 based on the occupancy of a queue associated with the particular NE 120 or 130 using an associated bandwidth and Expression 1.

If the status information of one of the NEs 120 and 130 cannot be determined by control device 110, control device 110 may evaluate transmission of other traffic via the one of the NEs 120 and 130. For example, if control device cannot communicate with a particular NE 120 included in a VPN, control device 110 may monitor transmission time signatures associated with data transmitted via the particular NE 120 to estimate a transmission delay.

The transmission of stream and other data associated with the subscriber may be modified based on the estimated transmission delay (or other criteria) in order to comply with the SLA. For example, a QCI value associated with the stream may be increased to reduce the transmission delay for the stream, or the QCI value associated with the stream may be decreased to increase the transmission delay for the stream. Control device 110 may further reduce the QCI value for other data that is not associated with the subscriber. For example, increasing QCI values for the other data may increase the transmission delay for the stream, and decreasing the QCI values for the other data may decrease the transmission delay for the stream.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense. For example, while a series of blocks has been described with respect to FIGS. 6 and 7, the order of the blocks may be modified in other implementations. Further, non-dependent blocks may be performed in parallel.

For example, control device 110 may cause data to be carried via a high bandwidth path in a first part of a path between UE 170 and end device 180, and carried via a low bandwidth path in a second part of the path between UE 170 and end device 180. In the example of FIG. 1, an associated SLA may be satisfied by transmitting the data via first high bandwidth pathway 150-H over an air channel and via low bandwidth pathways 140-L and 160-L. For example, control device 110 may determine all pathway configurations (i.e., selections among low and high bandwidth pathways 140-L, 140-H, 150-L, 150-H, 160-L, and 160 H) that satisfy requirements of an associated SLA and then select a low cost pathway configuration (i.e., the path way that uses minimum network resources).

It will be apparent that different aspects of the description provided above may be implemented in many different forms of software, firmware, and hardware in the implementations illustrated in the figures. The actual software code or specialized control hardware used to implement these aspects is not limiting of the invention. Thus, the operation and behavior of these aspects were described without reference to the specific software code—it being understood that software and control hardware can be designed to implement these aspects based on the description herein.

Further, certain portions of the invention may be implemented as a "component," a "module," "logic," or a "system" that performs one or more functions. These may include hardware, such as a processor, an ASIC, or a FPGA, or a combination of hardware and software.

Even though particular combinations of features are recited in the claims and/or disclosed in the specification, these combinations are not intended to limit the disclosure of the invention. In fact, many of these features may be combined in ways not specifically recited in the claims and/or disclosed in the specification. Although each dependent claim listed below may directly depend on only one other claim, the disclosure of the invention includes each dependent claim in combination with every other claim in the claim set.

No element, act, or instruction used in the present application should be construed as critical or essential to the invention unless explicitly described as such. Also, as used herein, the article "a" and "one of" is intended to include one or more items. Further, the phrase "based on" is intended to mean "based, at least in part, on" unless explicitly stated otherwise.

What is claimed is:

1. A method comprising:
   identifying, by a processor, a service level agreement (SLA) associated with transmitting data between a first device and a second device, wherein the data is transmitted via a path through a first network and a second network, wherein at least one of the first network and the second network is a wireless network, wherein a portion of the path through the first network includes a network element that is associated with a first pathway having a first bandwidth and a second pathway having a second bandwidth lower than the first bandwidth, wherein the path includes one of the first pathway or the second pathway, and wherein identifying the SLA includes:

determining a feature associated with the data, wherein the feature associated with the data includes at least one of a format associated with the data, a network address associated with the data, an application associated with the data, or a uniform resource locator (URL) associated with the data, and
identifying the SLA from a plurality of SLAs based on the feature;
identifying, by the processor and based on the SLA, a desired delay associated with transmitting the data between the first device and the second device;
determining, by the processor, a first occupancy of a first queue and a second occupancy of a second queue included in the network element, wherein the first queue is associated with the first pathway and the second queue is associated with the second pathway;
estimating, by the processor and based on the first occupancy, the second occupancy, the first bandwidth, and the second bandwidth, a first expected delay associated with transmitting the data through the first network via the one of the first pathway or the second pathway;
identifying, by the processor, a second expected delay associated with transmitting the data through the second network;
determining, by the processor and based on the first expected delay and the second expected delay, a composite delay associated with transmitting the data between the first device and the second device via the path and using the one of the first pathway or the second pathway;
comparing, by the processor, the composite expected delay and the desired delay; and
configuring, by the processor, the network element to transmit the data based on comparing the composite expected delay and the desired delay, wherein configuring the network element includes:
when the composite expected delay satisfies the desired delay and the composite expected delay and the desired delay differ by less than a threshold amount, causing the data to be transmitted via the one of the first pathway or the second pathway,
when the composite expected delay satisfies the desired delay and the composite expected delay and the desired delay differ by at least the threshold amount, causing the data to be transmitted via the second pathway, and
when the composite expected delay does not satisfy the desired delay:
determining whether the desired delay would be satisfied if the data is transmitted through the first network via the first pathway,
causing the data to be transmitted through the first network via the first pathway based on determining that the desired delay would be satisfied when the data is transmitted through the first network via the first pathway, and
causing the data to be transmitted through the first network via a different network element based on determining that the desired delay would not be satisfied when the data is transmitted through the first network via the first pathway.

2. The method of claim 1, wherein configuring the network element includes:
modifying a size of the queue based on comparing the desired delay and the composite expected delay.

3. The method of claim 1, wherein:
the path passes through a plurality of network elements that include the network element,
the plurality of network elements are associated with a plurality of high bandwidth pathways and a plurality of low bandwidth pathways, and
the method further comprises:
determining respective occupancies of queues associated with the plurality of network elements; and
selecting, based on the respective occupancies, a particular combination of pathways from the plurality of high bandwidth pathways and the plurality of low bandwidth pathways, wherein a delay associated with transmission of the data via path and through the particular combination of pathways is expected to satisfy the desired delay.

4. The method of claim 3, wherein selecting the particular combination of pathways includes:
identifying a plurality of possible combinations of pathways from the plurality of high bandwidth pathways and the plurality of low bandwidth pathways, wherein transmissions of the data via the plurality of possible combinations of pathways are expected to satisfy the requirement;
identifying respective costs associated with transmitting the data via the plurality of possible combinations of pathways; and
selecting the particular combination of pathways, from the plurality of possible combinations of pathways based on the respective costs.

5. The method of claim 1, further comprising:
identifying, based on the SLA, a desired number of dropped packets associated with transmitting the data; and
estimating, based on the first occupancy, the second occupancy, the first bandwidth, and the second bandwidth, expected numbers of dropped packets associated with transmitting the data via the first pathway or the second pathway,
wherein configuring the network element further includes:
causing the data to be transmitted via the first pathway further based on determining that the expected number of dropped packets satisfies the desired number of dropped packets and that the expected number of dropped packets and the desired number of dropped packets differ by less than the other threshold amount when the data is transmitted via the first pathway;
causing the data to be transmitted via the second pathway further based on determining that the expected number of dropped packets satisfies the desired number of dropped packets and when the data is transmitted via the second pathway; and
causing the data to be transmitted through the first network via a different network element further based on determining that the expected number of dropped packets does not satisfy the desired number of dropped packets when the data is transmitted through the first network via the first pathway.

6. The method of claim 1, wherein determining the first occupancy and the second occupancy includes:
measuring occupancies of the first queue and the second queue during a plurality of time periods; and
determining the first occupancy and the second occupancy based on the occupancies of the first queue and the second queue during the plurality of time periods.

7. A device comprising:
a memory configured to store information identifying a requirement associated with a service level agreement (SLA), wherein the requirement includes a desired delay for transmissions between a first device and a second device; and
a processor configured to:
    identify data associated with the SLA, wherein the data is to be transmitted between the first device and the second device via a path passing through a first network and a second network, wherein at least one of the first network and the second network is a wireless network, wherein a portion of the path through the first network includes by a network element using one of a first pathway or a second pathway, wherein the second pathway has a lower bandwidth than the first pathway, wherein the path includes one of the first pathway or the second pathway, and wherein the processor, when identifying the data associated with the SLA, is further configured to:
        determine a feature associated with the data, wherein the feature associated with the data includes at least one of a format associated with the data, a network address associated with the data, an application associated with the data, or a uniform resource locator (URL) associated with the data, and
        identify the SLA from a plurality of SLAs based on the feature,
    determine a status of the network element, wherein the status includes a first occupancy of a first queue associated with the first pathway and a second occupancy of a second queue associated with the second pathway,
    estimate, based on the status of the network element, a first result associated with transmitting the data via the network element using the one of the first pathway or the second pathway, wherein estimating the first result includes identifying a first delay associated with transmitting the data via the network element using the one of the first pathway or the second pathway,
    identify a second result associated with transmitting the data via the second network, wherein estimating the second result includes identifying a second delay associated with transmitting the data via the second network,
    determine, based on the first result and the second result, a composite result associated with transmitting the data via the path, wherein the composite result includes a composite delay associated with transmitting the data via the first network and the second network using the one of the first pathway or the second pathway;
    compare the requirement and the composite result, and
    configure the network element to transmit the data based on comparing the requirement and the composite result, wherein the processor, when configuring the network element, is further configured to:
        cause the data to be transmitted via the one of the first pathway or the second pathway when the composite expected delay satisfies the desired delay and the composite expected delay and the desired delay differ by less than a threshold amount,
        cause the data to be transmitted via the second pathway when the composite expected delay satisfies the desired delay and the composite expected delay and the desired delay differ by at least the threshold amount, and
        when the composite expected delay does not satisfy the desired delay:
            determine whether the desired delay would be satisfied if the data is transmitted via the first pathway,
            cause the data to be transmitted through the first network via the first pathway based on determining that the desired delay would be satisfied when the data is transmitted through the first network via the first pathway, and
            cause the data to be transmitted through the first network via a different network element based on determining that the desired delay would not be satisfied when the data is transmitted through the first network via the first pathway.

8. The device of claim 7, wherein:
the path passes through a plurality of network elements that include the network element,
the plurality of network elements are associated with a plurality of high bandwidth pathways and a plurality of low bandwidth pathways, and
the processor is further configured to:
    determine respective statuses of the plurality of network elements; and
    select, based on the respective statuses, a particular combination of pathways from the plurality of high bandwidth pathways and the plurality of low bandwidth pathways, wherein transmission of the data via the particular combination of pathways is expected to satisfy the requirement associated with the SLA.

9. A non-transitory computer-readable medium configured to store instructions, the instructions including:
one or more instructions that, when executed by a processor, cause the processor to be configured to:
    store information identifying a requirement associated with a service level agreement (SLA), wherein the requirement includes a desired delay between a first device and a second device;
    identify data associated with the SLA, wherein the data is to be transmitted between the first device and the second device via a path passing through a first network and a second network, wherein at least one of the first network and the second network is a wireless network, wherein a portion of the path through the first network includes a network element associated with a first pathway and a second pathway of lower bandwidth than the first pathway, and wherein the path includes one of the first pathway or the second pathway, and wherein the one or more instructions cause the processor, when identifying the data associated with the SLA, to:
        determine a feature associated with the data, wherein the feature associated with the data includes at least one of a format associated with the data, a network address associated with the data, an application associated with the data, or a uniform resource locator (URL) associated with the data, and
        identify the SLA from a plurality of SLAs based on the feature;
    determine a status of the network element, wherein the status includes a first occupancy of a first queue associated with the first pathway and a second occupancy of a second queue associated with the second pathway;

estimate, based on the status of the network element, a first result associated with transmitting the data via the network element using the one of the first pathway or the second pathway, wherein estimating the first result includes identifying a first delay associated with transmitting the data via the network element using the one of the first pathway or the second pathway;

identify a second result associated with transmitting the data via the second network, wherein estimating the second result includes identifying a second delay associated with transmitting the data via the second network;

determine, based on the first result and the second result, a composite result associated with transmitting the data via the path, wherein the composite result includes a composite delay associated with transmitting the data via the first network and the second network using the one of the first pathway or the second pathway;

compare the requirement and the composite result; and configure the network element to transmit the data using one of the first pathway or the second pathway based on comparing the requirement and the composite result, wherein the one or more instructions, further cause the processor, when configuring the network element, to:

cause the data to be transmitted via the one of the first pathway or the second pathway when the composite expected delay satisfies the desired delay and the composite expected delay and the desired delay differ by less than a threshold amount, cause the data to be transmitted via the second pathway when the composite expected delay satisfies the desired delay and the composite expected delay and the desired delay differ by at least the threshold amount, and when the composite expected delay does not satisfy the desired delay:

determine whether the desired delay would be satisfied if the data is transmitted via the first pathway, cause the data to be transmitted through the first network via the first pathway based on determining that the desired delay would be satisfied when the data is transmitted through the first network via the first pathway, and cause the data to be transmitted through the first network via a different network element based on determining that the desired delay would not be satisfied when the data is transmitted through the first network via the first pathway.

10. The non-transitory computer-readable medium of claim 9, wherein:

the path passes through a plurality of network elements that include the network element, the plurality of network elements are associated with a plurality of high bandwidth pathways and a plurality of low bandwidth pathways, and the instructions further include one or more instructions that, when executed by the processor, further cause the processor to be configured to:

determine respective statuses of the plurality of network elements; and select, based on the respective statuses, a particular combination of pathways from the plurality of high bandwidth pathways and the plurality of low bandwidth pathways, wherein transmission of the data via the particular combination of pathways is expected to satisfy the requirement associated with the SLA.

11. The non-transitory computer-readable medium of claim 10, wherein the one or more instructions to select the particular combination of pathways further include:

one or more instructions that, when executed by the processor, further cause the processor to be configured to:

identify a plurality of possible combinations of pathways from the plurality of high bandwidth pathways and the plurality of low bandwidth pathways, wherein transmissions of the data via the plurality of possible combinations of pathways are expected to satisfy the requirement;

identify respective costs associated with transmitting the data via the plurality of possible combinations of pathways; and select the particular combination of pathways, from the plurality of possible combinations of pathways based on the respective costs.

12. The device of claim 7, wherein the processor, when identifying the first delay, is further configured to:

divide the first occupancy of the first queue by a bandwidth of the first pathway when the data is transmitted via the first pathway, and divide the second occupancy of the second queue by a bandwidth of the second pathway when the data is transmitted via the second pathway.

13. The device of claim 7, wherein the first network is associated with a first service provider and the second network is associated with a second service provider, wherein the device is associated with a the first service provider, and wherein the processor, when identifying the second delay associated with transmitting the data via the second network, is further configured to:

monitor traffic transmitted via the second network to identify delays associated with transmitting the traffic via the second network, and determine the second delay based on the delays associated with transmitting the traffic via the second network.

14. The device of claim 7, wherein the network element is a first network element, wherein the processor, when identifying the second delay associated with transmitting the data via the second network, is further configured to:

identify a second network element included in a portion of the path through the second network;

determine an occupancy of a queue associated with the second network element; and determine the second delay based on the occupancy of the queue associated with the second network element.

15. The device of claim 7, wherein the processor, when causing the data to be transmitted via the first pathway, is further configured to increase a quality of service (QoS) value associated with the data, and wherein the processor, when causing the data to be transmitted via the second pathway, is further configured to decrease a quality of service (QoS) value associated with the data.

16. The method of claim 1, wherein causing the data to be transmitted through the first network via the first pathway further includes:

causing other data, scheduled for delivery via the first pathway, to be transmitted via the second pathway.

17. The method of claim 1, wherein causing the data to be transmitted via the second pathway further includes:

causing other data, scheduled for delivery via the second pathway, to be transmitted via the first pathway.

18. The device of claim 7, wherein the processor, when causing the data to be transmitted through the first network via the first pathway, is further configured to:
    cause other data, scheduled for delivery via the first pathway, to be transmitted via the second pathway.

19. The device of claim 7, wherein the processor, when causing the data to be transmitted via the second pathway, is further configured to:
    cause other data, scheduled for delivery via the second pathway, to be transmitted via the first pathway.

\* \* \* \* \*